(12) United States Patent
Mayer

(10) Patent No.: US 6,639,252 B2
(45) Date of Patent: Oct. 28, 2003

(54) INTEGRATED CIRCUIT AND METHOD FOR FABRICATING AN INTEGRATED CIRCUIT

(75) Inventor: Albrecht Mayer, Deisenhofen (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/042,430

(22) Filed: Jan. 7, 2002

(65) Prior Publication Data

US 2002/0098603 A1 Jul. 25, 2002

(30) Foreign Application Priority Data

Jan. 5, 2001 (DE) .......................................... 101 00 344

(51) Int. Cl.$^7$ ........................ H01L 29/74; H01L 31/111
(52) U.S. Cl. ......................... 257/107; 257/140; 438/14
(58) Field of Search ................................. 257/107, 115, 257/130, 140, 141, 162, 154; 438/14, 17, 18

(56) References Cited

U.S. PATENT DOCUMENTS 5,565,810 A * 10/1996 Hammel et al.

OTHER PUBLICATIONS

Wolfgang Schmitt: "Nexus—Debug–Konzept der Zukunft?" [nexus—debug concept of the future?], Electronik 17/1999, pp. 52–59.
Joseph Desposisto: "New Debug Tools Give Designers Alternatives To In–Circuit Emulators", Electronic Design, Aug. 1999, pp. 47–54.

* cited by examiner

Primary Examiner—Phuc T. Dang
(74) Attorney, Agent, or Firm—Laurence A. Greenberg; Werner H. Stemer; Ralph E. Locher

(57) ABSTRACT

An integrated circuit includes a first circuit section and a second circuit section, which is necessary or useful for the emulation of the first circuit section. Such an integrated circuit provides the necessary conditions which allow emulating the integrated circuit. An integrated circuit which optionally contains such a second circuit section or another second circuit section or no such circuit section can be fabricated particularly simply if exposure masks are used for fabrication that have respective patterns for fabricating a first circuit section and patterns for fabricating a second circuit section. That part of the exposure masks which serves for fabricating the second circuit section is covered during the fabrication of a first variant of the integrated circuit, and remains uncovered during the fabrication of a second variant of the integrated circuit.

14 Claims, 2 Drawing Sheets

INTEGRATED CIRCUIT AND METHOD FOR FABRICATING AN INTEGRATED CIRCUIT

BACKGROUND OF THE INVENTION

Field of the Invention

The invention relates to an integrated circuit and to a method for fabricating an integrated circuit.

The complexity of integrated circuits and the speed at which they operate are continually increasing and it is primarily because of this that integrated circuits have the problem that the users of the integrated circuits, more precisely the users of the modules containing the integrated circuits, are often no longer able to identify and eliminate the causes of improper functioning of the integrated circuits and/or of the systems containing the integrated circuits.

For this reason, so-called emulators were developed for particularly complex integrated circuits such as, for example, microprocessors and microcontrollers. These emulators can be used, during normal operation of an integrated circuit, to observe and change as desired internal states and sequences in the integrated circuit (for example register contents, memory contents, and/or addresses, data, control signals transmitted via internal or external lines or buses, etc.).

During the emulation of an integrated circuit, the latter (the module containing the latter) is generally moved from the system containing it and replaced by a special circuit, this special circuit containing the integrated circuit itself that is to be tested (if the integrated circuit removed from the system is inserted into the special circuit) or a particular version of the integrated circuit (a so-called bond-out version which has additional terminals for observing internal states or operations). Such an emulation has a number of disadvantages.

One of the disadvantages is that removing the integrated circuit from the system and replacing it by a circuit of whatever configuration is either not possible at all (for example if the integrated circuit to be emulated is soldered in or difficult to access or surrounded by a Faraday cage), or is at least very complicated.

A further disadvantage is that during the emulation of the integrated circuit to be emulated, on account of the changes required for this, the system often no longer behaves exactly as in normal operation. This has two causes: firstly because the integrated circuit to be emulated is replaced by a special circuit, and secondly because the special circuit usually no longer contains the integrated circuit itself that is to be emulated, but rather a particular version (the bond-out version already mentioned) of the integrated circuit.

Furthermore, the development and fabrication of a bond-out version of integrated circuits are very complicated and expensive. Moreover, bond-out versions are often available on the market only after the standard versions of the integrated circuits are available.

In order to avoid these disadvantages, one has resorted in the meantime to equipping in particular relatively complex integrated circuits with a so-called on-chip debug support module (OCDS module) as standard. However, integrating an OCDS module into the integrated circuit makes the latter considerably larger and more expensive than would be the case without the OCDS module, and counteracts endeavors to fabricate integrated circuits which are smaller and smaller and less and less expensive. This is particularly distressing because integrated circuits with an OCDS module are generally not offered without an OCDS module, and because the OCDS module of an integrated circuit is required at most for the system development but not for the normal operation of the integrated circuit.

These disadvantages are even more pronounced if the OCDS module not only has breakpoint functionality but additionally contains measures which also enable the program flow and data accesses to be observed (trace function).

SUMMARY OF THE INVENTION

It is accordingly an object of the invention to provide an integrated circuit and a method of fabricating an integrated circuit which overcome the above-mentioned disadvantages of the heretofore-known integrated circuits and fabrication methods of this general type and which provide the conditions that allow emulating an integrated circuit simply and reliably under all circumstances.

With the foregoing and other objects in view there is provided, in accordance with the invention, an integrated circuit, including:

a first circuit section; and a second circuit section operatively connected to the first circuit section, the second circuit section being configured to be necessary or useful for emulating the first circuit section.

With the objects of the invention in view there is also provided, a method for fabricating an integrated circuit, the method includes the steps of:

fabricating an integrated circuit by using exposure masks respectively including patterns for fabricating a first circuit section of the integrated circuit and patterns for fabricating a second circuit section of the integrated circuit; and selectively covering a respective part of the exposure masks that serves for fabricating the second circuit section during a fabrication of a first variant of the integrated circuit, and leaving the respective part of the exposure masks that serves for fabricating the second circuit section uncovered during a fabrication of a second variant of the integrated circuit.

A preferred mode of the method according to the invention includes the step of using displaceable elements of a screen for covering regions of the exposure masks that are to be covered.

In other words, the object of the invention is achieved by virtue of the fact that the integrated circuit includes a first circuit section and a second circuit section, which is necessary or useful for the emulation of the first circuit section, and, respectively, by virtue of the fact that that exposure masks are used for fabricating the integrated circuit, on which masks there are respective patterns for fabricating a first circuit section of the integrated circuit and patterns for fabricating a second circuit of the integrated circuit section, and in that that part of the exposure masks which serves for fabricating the second circuit section is covered during the fabrication of a first variant of the integrated circuit, and remains uncovered during the fabrication of a second variant of the integrated circuit.

A module which contains the abovementioned second circuit section is a module which does not have to be taken from the system containing it and need not be replaced by a special circuit in order to be emulated. The emulation of such a module can therefore be carried out extremely simply and reliably under all circumstances.

Moreover, an (emulatable) module containing the first circuit section and the second circuit section is, surprisingly, not larger than a (non-emulatable) module containing only the first circuit section. This is because for quite a long time the size of a module containing an integrated circuit, more precisely the size of the housing of the module, does no longer depend on the size of the integrated circuit. What is critical for the size, rather, is the number of input and/or output terminals of the module and the mutual spacing which these input and/or output terminals must have as a minimum in order that they can still be connected to assigned contact points. In general, in particular in the case of more complex modules such as microprocessors, microcontrollers, etc., an integrated circuit contained therein can be enlarged without an accompanying enlargement of the module.

Irrespective of this, it is possible in an extremely simple manner to fabricate an emulatable and a non-emulatable version of the module. An emulatable version of the module is developed and the second circuit section is simply omitted during the fabrication of the non-emulatable version of the module.

The procedure for omitting the second circuit section may be that, during the module fabrication, the work is always carried out using an exposure mask for the emulatable module, and that that part of the exposure mask which contains the patterns for the second circuit section is simply covered in order to fabricate a non-emulatable module.

In the case of a module constructed and fabricated in this way, the emulatable version and the non-emulatable version do not exhibit differences either externally or in their behavior, so that an emulatable module or a non-emulatable module can optionally be inserted in the system containing the module.

An integrated circuit which is constructed in the manner described and a fabrication thereof which is effected in the manner described make it possible, in a simple manner to create the precondition for being able to emulate an integrated circuit simply and reliably under all circumstances.

According to another feature of the invention, the second circuit section includes a logic circuit, the logic circuit is configured to set given conditions in the first circuit section and to monitor whether given conditions in the first circuit section are achieved.

According to another feature of the invention, the second circuit section includes a trace memory, the trace memory continuously stores a memory content of interest, a register content of interest, data of interest, addresses of interest and/or control signals occurring within a given time window.

According to yet another feature of the invention, the second circuit section includes a compression unit for compressing data to be written to the trace memory and/or data to be output from the trace memory.

According to a further feature of the invention, the second circuit section includes at least one overlay memory and a program memory and/or a data memory, the first circuit section is configured such that the at least one overlay memory can be used instead of the program memory and/or the data memory.

According to another feature of the invention, the first circuit section and the second circuit section are connected to one another such that the first circuit section behaves, when the second circuit section is not present, in exactly a same manner as when the second circuit section is present.

According to yet another feature of the invention, the first circuit section and the second circuit section form a circuit configuration; and the second circuit section is disposed within the circuit configuration such that the second circuit section can be omitted from the circuit configuration by partially covering exposure masks used for fabricating the integrated circuit configuration.

According to a further feature of the invention, the first circuit section and the second circuit section form a semiconductor chip circuit configuration having given regions; and the first circuit section and the second circuit section are provided in mutually non-overlapping ones of the given regions.

According to another feature of the invention, the first circuit section and the second circuit section form a semiconductor chip circuit configuration having given regions; and the first circuit section and the second circuit section are provided in mutually non-interleaved ones of the given regions.

According to yet another feature of the invention, the first circuit section and the second circuit section form a semiconductor chip circuit configuration having given regions; and the first circuit section and the second circuit section are provided in mutually adjacent ones of the given regions.

According to another feature of the invention, at least the first circuit section and the system components form an integrated circuit configuration having a given region, the first circuit section occupies the given region; and the integrated circuit configuration includes contact points connecting the first circuit section to at least one system component, the contact points are provided within the given region of the integrated circuit configuration occupied by the first circuit section.

According to a further feature of the invention, the integrated circuit configuration forms a module; and the second circuit section is configured such that a communication required between the second circuit section and devices provided outside the module is effected via the first circuit section.

According to another feature of the invention, the first circuit section and the second circuit section form an integrated circuit configuration with a given region, the second circuit section occupies the given region, the integrated circuit configuration forms a module and includes contact points disposed within the given region occupied by the second circuit section, the second circuit section is connectable to external devices provided outside the module.

Other features which are considered as characteristic for the invention are set forth in the appended claims.

Although the invention is illustrated and described herein as embodied in an integrated circuit and a method for fabricating an integrated circuit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

The integrated circuit described below is a microprocessor or microcontroller. However, it is noted that the special features of the described integrated circuit which are explained below can also be provided in any other integrated circuits in which there is a need to extend the functionality and/or performance thereof as required.

The integrated circuit described is distinguished by the fact that it includes a first circuit section and a second circuit section, which is necessary or useful for the emulation of the first circuit section.

The first circuit section contains the circuit which is actually intended to be realized by the integrated circuit, that is to say is the microprocessor or microcontroller in the example considered; the second circuit section contains "only" components which are necessary or useful for the emulation of the first circuit section, such as, for example,

- a logic configuration, generally referred to as breakpoint logic or watchpoint logic, for setting and monitoring the achievement of specific conditions in the first circuit section (for example access to a specific address, reading and/or writing and/or use of specific data, execution of a specific instruction, occurrence of a specific control signal, etc.),
- a so-called trace memory in which the following are continuously stored which are of interest: memory or register contents, data, addresses and/or control signals which occur within a definable time window in the first circuit section,
- a compression unit for compressing the data to be written to the trace memory and/or the data to be output from the trace memory, and/or
- additional memories, more precisely so-called overlay memories, which can replace, as required, read-only memories (ROMs) contained in the first semiconductor chip or memories whose content can be changed only in a complicated manner (flash memories, EPROMS, EEPROMS, etc.).

The trace memory, which the second circuit section preferably contains, is preferably configured as a circular buffer and

- permanently records preferably (for example using a muliplexer) selectable data, addresses, and/or control signals and
- interrupts (for example with an adjustable lag) the recording when a set breakpoint or watchpoint is reached.

Figure 1:
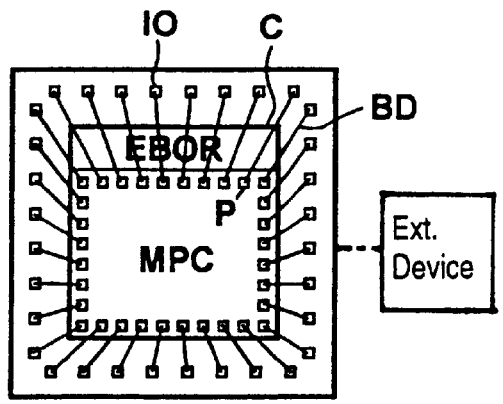
FIG. 1 is a diagrammatic plan view of an exemplary embodiment of a first version of a module according to the invention.

A module containing an integrated circuit including a first circuit section and a second circuit section is shown in FIG. 1.

The configuration shown in FIG. 1 includes:
- a semiconductor chip C having
- a first circuit section MPC corresponding to the first circuit section described above,
- a second circuit section EBOR, which is connected to the first circuit section MPC and corresponds to the second circuit section described above, and
- contact points (Pads) P assigned to the first circuit section MPC,
- input and/or output terminals IO for connecting the module to other components of the system containing the module, and
- bonding wires BD for connecting the input and/or output terminals IO to the pads P.

Figure 2:
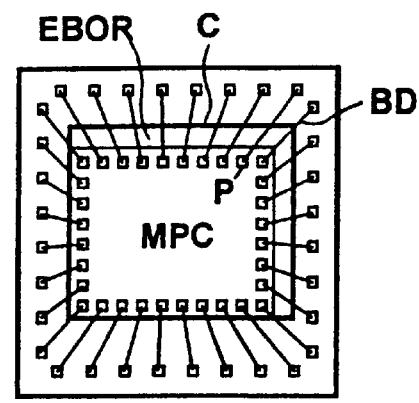
FIG. 2 is a diagrammatic plan view of a second exemplary embodiment of the first version of the module according to the invention.

A further exemplary embodiment of a module containing an integrated circuit including a first circuit section and a second circuit section is shown in FIG. 2.

The module shown in FIG. 2 corresponds virtually entirely to the module shown in FIG. 1 wherein identical reference symbols designate mutually corresponding elements. Only the form of the second circuit section EBOR is different.

It should be apparent that there is no restriction in respect of choosing the forms of the circuit sections MPC and EBOR (the forms the regions of the semiconductor chip C which contain the circuit sections MPC and EBOR) and the relative position of the circuit sections MPC and EBOR in the manner shown in FIGS. 1 and 2. In principle, the forms of the circuit sections MPC and the relative position thereof can be freely chosen independently of one another.

In both cases i.e. both in the case of the module in accordance with FIG. 1 and in the case of the module in accordance with FIG. 2, the second circuit section EBOR has no contact points which are connected to the input and/or output terminals IO of the module. If communication is required between the second circuit section EBOR and devices provided outside the module, the communication is effected via the first circuit section (via the pads P assigned thereto and the input and/or output terminals IO connected to the latter), to be precise preferably via an interface which is also used or can also be used for a different purpose, such as, for example, via a so-called JTAG interface or a NEXUS interface.

FIG. 1 schematically shows an external device provided outside the module. The provision of the second circuit section therefore does not result in an increase, or at any rate does not necessarily result in an increase, in the number of input and/or output terminals of the module. If necessary, the second circuit section EBOR may, however, also have dedicated contact points for connection to devices provided outside the module.

Irrespective of all that, it proves to be advantageous if the first circuit section and the second circuit section are connected up to one another in such a way that omission of the second circuit section has no effects on the behavior of the first circuit section.

In that case, a "normal", non-emulatable module version can be created from the emulatable module versions shown in FIGS. 1 and 2 simply by omitting the second circuit section EBOR.

In this case, it proves to be advantageous if the second circuit section EBOR is provided in such a way that the size of the semiconductor chip C can be reduced through omission of the second circuit section.

This possibility exists, in particular, when, as in the examples shown in FIGS. 1 and 2,
- the second circuit section EBOR is provided at the edge of the semiconductor chip C, and
- the pads P are provided within that region of the semiconductor chip C which is occupied by the first circuit section MPC.

Figure 3:
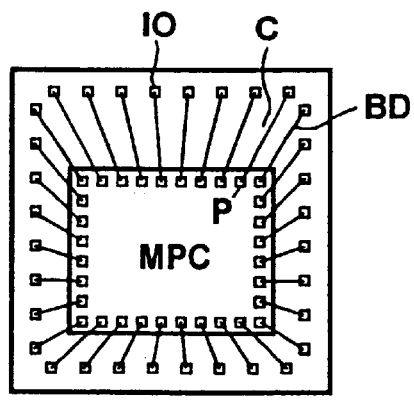
FIG. 3 is a diagrammatic plan view of a second version of the modules shown in FIGS. 1 and 2.

A module version which does not have a second circuit section is shown in FIG. 3.

The module version which is shown in FIG. 3 does not contain a second circuit section EBOR and has a correspondingly smaller semiconductor chip C, but otherwise corresponds to the module versions shown in FIGS. 1 and 2.

In particular, the emulatable module versions shown in FIGS. 1 and 2 and the non-emulatable module version shown in FIG. 3 have the same external dimensions, the same position and allocation of the input and/or output terminals, and exactly the same behavior.

The emulatable module version is not larger than the non-emulatable module version. The non-emulatable module version cannot be made smaller even though it can contain a smaller semiconductor chip than the emulatable module version. In complex integrated circuits, the size of a module containing the latter is not determined by the size of the semiconductor chip C, but rather by the number, the position, and the minimum possible spacings of the input and/or output terminals IO.

On account of the circumstances mentioned above and, moreover, on account of the possibility of making the semiconductor chip C smaller in a non-emulatable module than in an emulatable module version, the possible integration of components which are necessary or useful for the emulation of the module into the module (the integration of the second circuit section into the module) gives rise to no disadvantages whatsoever: the non-emulatable module version is not larger and/or more expensive than is absolutely necessary for normal use (use in the fully developed system operating without any errors).

The emulatable module version and the non-emulatable module version can be fabricated particularly simply if, for fabricating the integrated circuit, exposure masks are used which are configured for the fabrication of an emulatable module version, that is to say contain patterns for the first circuit section and patterns for the second circuit section, and that that part of the exposure masks which serves for fabricating the second circuit section is covered during the fabrication of the non-emulatable variant of the integrated circuit, and remains uncovered during the fabrication of the emulatable variant of the integrated circuit.

This is possible in a particularly simple manner if the first circuit section MPC and the second circuit section EBOR are provided in mutually non-overlapping and non-mutually interleaved, that is to say mutually adjacent regions.

In that case, the possibly required coverage of that part of the exposure masks which carries the pattern for the second circuit section can be realized simply by corresponding alteration of the opening of a screen provided in front of or behind the respective exposure mask.

Figure 4:
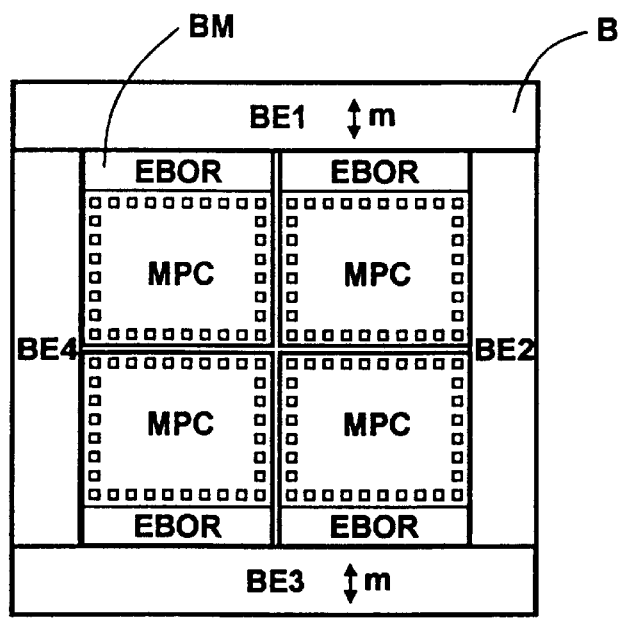
FIG. 4 is a diagrammatic plan view of an exposure mask for fabricating the modules shown in FIGS. 1 to 3.
Figure 5:
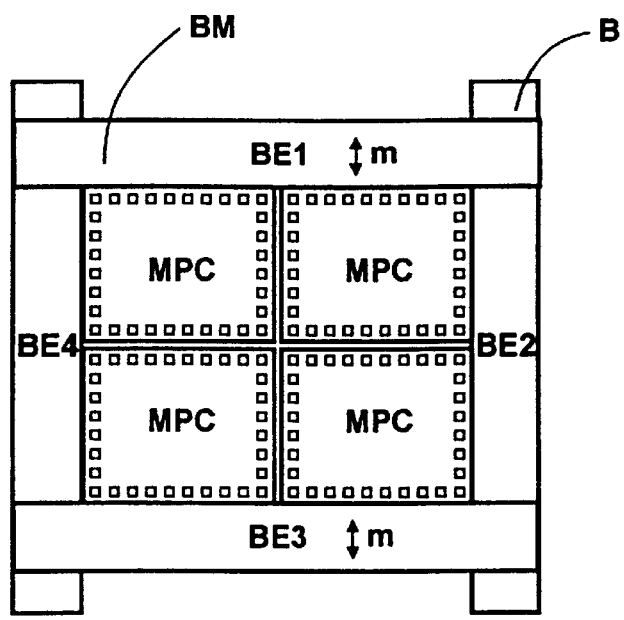
FIG. 5 is a diagrammatic plan view of the exposure mask in accordance with FIG. 4 in a partly covered state.

This is illustrated by way of example in FIGS. 4 and 5.

FIGS. 4 and 5 show an exposure mask BM and a screen B provided in front of or behind the exposure mask, in which case the exposure mask BM carries patterns for the first circuit section MPC and the second circuit section EBOR of four integrated circuits, and the screen B includes a plurality of elements BE1 to BE4 which can be moved relative to one another at least partially.

In the example considered, the screen elements BE1 and BE3 can be displaced along the direction designated by double arrows m in FIGS. 4 and 5.

In the case of the illustration shown in FIG. 4, the screen elements BE1 and BE3 are set in such a way that both the patterns for the first circuit sections and the patterns for the second circuit sections are uncovered, that is to say emulatable modules can be fabricated.

From the position of the screen elements as shown in FIG. 4, the screen elements can be displaced in such a way that they cover the patterns for the second circuit sections. In the example considered, this is done by the screen elements BE1 and BE3 being shifted towards one another.

The result of this operation is illustrated in FIG. 5. Here, the screen elements BE1 and BE3 are set in such a way that they cover the patterns for the second circuit sections, that is to say non-emulatable modules can be fabricated.

It should be apparent that, depending on the form and configuration of the second circuit section, differently shaped and/or constructed screens and/or other movements of the screen elements may be necessary in order that the patterns for the second circuit section are optionally covered or left uncovered.

As a result, emulatable modules and non-emulatable modules can be fabricated using one and the same exposure masks.

As has already been indicated above, a second circuit section configured and provided in the manner described above can be used not only for emulating the first circuit section. In addition or as an alternative, it can also fulfill any other desired functions, for example provide additional memory, an A/D converter, a cryptographic unit and/or any other desired components for the first circuit section.

I claim:

1. An integrated circuit, comprising:

a first circuit section; and a second circuit section operatively connected to said first circuit section, said second circuit section being configured to be one of necessary for emulating said first circuit section and useful for emulating said first circuit section;

said first circuit section and said second circuit section being connected to one another to cause said first circuit section to behave, when said second circuit section is not present, in exactly the same manner as when said second circuit section is present.

2. The integrated circuit according to claim 1, wherein said second circuit section includes a logic circuit, said logic circuit is configured to set given conditions in said first circuit section and to monitor whether given conditions in said first circuit section are achieved.

3. The integrated circuit according to claim 1, wherein said second circuit section includes a trace memory, said trace memory continuously stores at least one item of information selected from the group consisting of a memory content of interest, a register content of interest, data of interest, addresses of interest and control signals occurring within a given time window.

4. The integrated circuit according to claim 3, wherein said second circuit section includes a compression unit for compressing at least one of data to be written to said trace memory and data to be output from said trace memory.

5. The integrated circuit according to claim 1, wherein said second circuit section includes at least one overlay memory and at least one of a program memory and a data memory, said first circuit section is configured such that said at least one overlay memory can be used instead of said at least one of said program memory and said data memory.

6. An integrated circuit, comprising:

a first circuit section; and a second circuit section operatively connected to said first circuit section, said second circuit section being configured to be one of necessary for emulating said first circuit section and useful for emulating said first circuit section;

said first circuit section and said second circuit section forming a circuit configuration; and said second circuit section being disposed within said circuit configuration for permitting said second circuit section to be omitted from said circuit configuration by partially covering exposure masks used for fabricating said integrated circuit configuration.

7. The integrated circuit according to claim 1, wherein:
said first circuit section and said second circuit section form a semiconductor chip circuit configuration having given regions; and
said first circuit section and said second circuit section are provided in mutually non-overlapping ones of said given regions.

8. The integrated circuit according to claim 1, wherein
said first circuit section and said second circuit section form a semiconductor chip circuit configuration having given regions; and
said first circuit section and said second circuit section are provided in mutually non-interleaved ones of said given regions.

9. The integrated circuit according to claim 1, wherein:
said first circuit section and said second circuit section form a semiconductor chip circuit configuration having given regions; and
said first circuit section and said second circuit section are provided in mutually adjacent ones of said given regions.

10. The integrated circuit according to claim 1, including:
system components, at least said first circuit section and said system components forming an integrated circuit configuration having a given region, said first circuit section occupying said given region; and
said integrated circuit configuration including contact points connecting said first circuit section to at least one of said system components, said contact points being provided within said given region of said integrated circuit configuration occupied by said first circuit section.

11. The integrated circuit according to claim 10, wherein:
said integrated circuit configuration forms a module; and
said second circuit section is configured such that a communication required between said second circuit section and devices provided outside said module is effected via said first circuit section.

12. The integrated circuit according to claim 1, wherein said first circuit section and said second circuit section form an integrated circuit configuration with a given region, said second circuit section occupies said given region, said integrated circuit configuration forms a module and includes contact points disposed within said given region occupied by said second circuit section, said second circuit section is connectable to external devices provided outside said module.

13. A method for fabricating an integrated circuit, the method which comprises:
fabricating an integrated circuit by using exposure masks respectively including patterns for fabricating a first circuit section of the integrated circuit and patterns for fabricating a second circuit section of the integrated circuit;
configuring the second circuit section to be one of necessary for emulating the first circuit section and useful for emulating the first circuit section;
selectively covering a respective part of the exposure masks that serves for fabricating the second circuit section during a fabrication of a first variant of the integrated circuit, and leaving the respective part of the exposure masks that serves for fabricating the second circuit section uncovered during a fabrication of a second variant of the integrated circuit; and
operatively connecting the first circuit section and the second circuit section to one another to cause the first circuit section to behave, when the second circuit section is not present, in exactly the same manner as when the second circuit section is present.

14. The method according to claim 13, which comprises using displaceable elements of a screen for covering regions of the exposure masks that are to be covered.

* * * * *